(No Model.)
W. H. BALL.
BRACELET.
No. 254,256.  Patented Feb. 28, 1882.
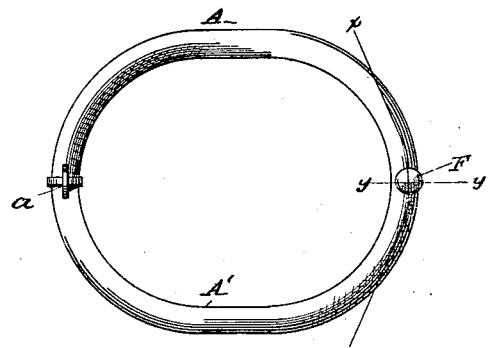
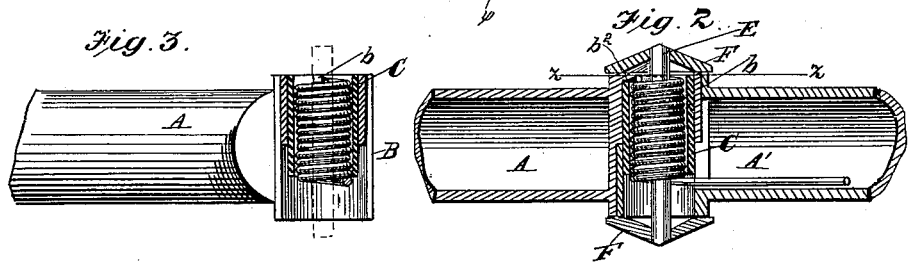
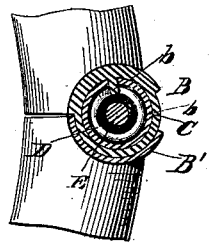
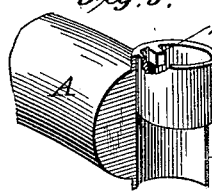    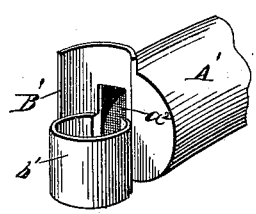
Attest,
W. H. Knight,
F. H. Knight
Inventor,
Wm. H. Ball,
by Abraham & Mayer
his attorneys

UNITED STATES PATENT OFFICE.

WILLIAM H. BALL, OF NEWARK, NEW JERSEY.

BRACELET.

SPECIFICATION forming part of Letters Patent No. 254,256, dated February 28, 1882.

Application filed November 9, 1881. (No model.)

*To all whom it may concern:*

Be it known that I, WILLIAM H. BALL, a citizen of the United States, residing at Newark, in the county of Essex and State of New Jersey, have invented a new and useful Improvement in Bracelets, of which the following is a specification.

My invention relates to that class of bracelets composed of two segmental wings hinged together and made to open in order to be placed on the wrist, and being maintained thereon by means of spring-pressure; and it consists of the peculiar manner of constructing the hinge and adjustment of the spring and other operative parts, as hereinafter described.

Referring to the accompanying drawings, in which similar letters of reference indicate like parts, Figure 1 represents a bracelet closed up embodying my invention. Fig. 2 is a sectional view thereof on the line $x\ x$. Fig. 3 is a sectional view taken on the line $y\ y$. Fig. 4 is a sectional view on the line $z\ z$, Fig. 2. Figs. 5, 6, 7, 8, 9 represent parts in detail.

A A' are the two segmental wings. They are shown in Fig. 1 as locked forwardly with an ordinary snap-catch, $a$; but such a catch is not essential, as the terminal ends of the wings may be finished with knobs, bosses, or any ornamental device, as the bracelet being maintained on the wrist by pressure of the rear spring, as hereinafter described. The wing A is provided rearwardly with a vertical curved flange, B, which extends the full width of the wing. The upper part of this flange, nearly half of its width, is carried completely round, forming the eye $b$. Within the eye $b$, at its upper part, is an extending lug, $b^2$. The wing A' has also a curved flange, B', which, for about half its width, as on the other section, is continued completely round, forming the lower eye, $b'$. This eye has no lug, but is finished smoothly internally and externally. The eye $b'$, where joined to the wing A', is cut away, forming the opening $a^2$, coincident with an opening in the said wing, hollowed out for reception of the arm $d'$ of the spring D.

C is a short loose sleeve, the exterior circumference of which admits of its being slipped within the eyes $b\ b'$. It is provided with a notch, $c$, at its upper periphery to receive and engage the lug $b^2$ within the eye $b$.

D is a spiral spring, the upper end coil of which has an impinging point, $d$, the lower coil terminating in an extending arm, $d'$.

E is a central pin, which passes through the core of the coiled spring D, and is fastened to the caps F, or in any suitable manner, so as to form a pivotal post.

The several parts comprising my improvement are adjusted and operated as follows: The spring D is placed within the sleeve C, the short end $d$ being turned near the upper notch, $c$. The lower arm, $d'$, extending outwardly below the lower peripheral edge of the sleeve C, is then passed its full length through the opening $a^2$ into the hollowed part of the wing A', and the two segmental wings are adjusted together by means of the sleeve C, one end of which rests within the eye $b$ and the other end within the eye $b'$, the lug $b^2$ falling and engaging within the notch $c$. The lug $b^2$ is somewhat longer than the thickness of the sleeve C, and thus passes entirely through and extends somewhat outwardly within the sleeve C, forming a stop against which the upper end, $d$, of the spring D is impinged. The two segmental wings are thus hinged together, and the spring D, having its upper end, $d$, impinged against the lug $b^2$, and its lower extended arm, $d'$, held with the hollowed wing A', the two wings are thus spring-pressed against each other. To prevent disengagement of the several parts, the pin E is passed through the spring D, this pin being rigidly held in position by adjustment to the caps F or any similar connection, forming a pivotal post.

The operation of the device is manifest. The several parts, connected as described, form a spring-pressed hinge turning on an interior sleeve, relieving the spring from friction, the spring being prevented from turning by the described connections of its terminal coils, which provide required leverage.

Having now fully described my invention, what I claim is—

1. The combination of the eye $b$, having an upper interior lug, $b^2$, and the eye $b'$, having opening $a^2$, with the sleeve C, provided with notch $c$, and its inclosed spring D, having impinging point $d$ and extending arm $d'$, substantially as described.

2. In a segmental bracelet, the curved flanges

B B', the eyes $b\ b'$, and the sleeve C, in combination with the coiled spring D, having impinging point $d$ and extending arm $d'$, and the pivotal post E.

3. In a two-part bracelet joined by a spring-pressed hinge, each wing having a curved segmental flange provided with eyes $b\ b'$, in combination with the coiled spring D, having impinging point $d$ and extending arm $d'$ inclosed within sleeve C, and the pivotal pin E, substantially as described.

WM. H. BALL.

Witnesses:
 EUG. MACDONALD,
 STEPHEN B. KENT.